Patented Dec. 30, 1930

1,787,419

UNITED STATES PATENT OFFICE

THOMAS MIDGLEY, JR., OF DAYTON, OHIO, ASSIGNOR, BY MESNE ASSIGNMENTS, TO GENERAL MOTORS CORPORATION, OF DETROIT, MICHIGAN, A CORPORATION OF DELAWARE

METHOD FOR USING MOTOR FUELS

No Drawing. Original application filed April 15, 1922, Serial No. 553,270. Patent No. 1,573,846, dated February 23, 1926. Divided and this application filed January 22, 1926. Serial No. 83,133.

This invention relates to fuels, such, for example, as kerosene and gasoline, employed in the operation of internal-combustion engines and to the art of burning the fuels in an engine. The present tendency is to produce lower grades of gasoline in order to obtain a sufficient output for the increasing demand for motor fuels and to reduce the compressions of the engines so that these lower grades of fuel may be used without knocking. As the lowering of engine compression reduces the efficiency of the engine, a still greater output of fuel is required to meet the increase in fuel required to operate larger and less efficient engines. The principal objects of the present invention are to overcome these difficulties and to provide a means for using either low or high grades of motor fuel more efficiently and so reduce the quantity of fuel used.

The present application is a division of my co-pending application Serial No. 553,270, filed April 15, 1922; now Patent No. 1,573,846, Feb. 23, 1926.

Kerosene, gasoline and the heavier hydrocarbons have the characteristic that, when a combustible gaseous mixture containing one of these fuels and air is burned in an internal combustion engine while subjected to a relatively high pressure, a fuel knock is produced, the engine heats rapidly, the efficiency of the engine is reduced, and, if the initial pressure is very high, engine parts may be injured. The highest pressure at which a mixture may be burned in a cylinder without producing a fuel knock varies with the different fuels and, to some extent, with the temperature, position of spark plugs and other conditions within the engine. This pressure I term the "critical compression pressure" of the fuel.

The average critical compression pressure of kerosene is about 50 pounds, of the poorer grades of gasoline about 75 pounds and of the better grades of gasoline about 125 pounds. The latter grade of gasoline is produced in limited quantities and is not available universally to the consumer. The commoner grades of fuel, such as kerosene and gasoline, having critical compression pressures below 75 pounds are used generally, and internal-combustion engines for house lighting systems, trucks, tractors, and automobiles are designed to operate on these kinds of fuel.

I have found that the critical compression pressure of a fuel of the type mentioned above is increased by incorporating therewith any one of a large number of compounds containing metallic elements i. e., compounded metallic elements.

By way of example, I may use a fuel consisting by volume of ¼ of one percent of tetra ethyl lead and 99¾ per cent of gasoline having a normal "critical compression pressure" of about 75 pounds. The tetra ethyl lead dissolves in the gasoline forming a fuel having a "critical compression pressure" of about 160 pounds. The presence of the lead compound changes the gasoline from a low compression fuel to a higher compression fuel i. e. increases its "critical compression pressure". This gasoline may be used in an engine having a compression pressure of about 160 pounds with a smaller fuel consumption for obtaining a given amount of work than is required to operate an engine having a compression pressure of 75 pounds on the untreated gasoline. Experiments with automobiles have shown that if the engine compression is increased to 160 pounds, a treated fuel being used to run the engine and the gear ratio between the engine and the rear axle is reduced, the mileage obtained from a gallon of gasoline is substantially twice that obtained when running the engine at 75 pounds compression on the untreated or low compression fuel.

For some commercial purposes it will probably be sufficient to use but one part of tetra ethyl lead in 2000 parts of gasoline. This mixture may be used in a truck motor to avoid the knock generally produced when climbing hills at low speed with open throttle. Relatively small proportional quantities of the lead compound are required to increase the critical compression pressure of "aviation" gasoline from 125 pounds to 160 pounds or more.

The fuel mixture or combination may also be varied by using other fuels as the fuel base or major constituent of the high compression fuel and using other compounded metallic elements to increase critical compression pressure. The fuels used include gasoline and other hydrocarbon fuels containing hydrocarbons which may be obtained from an asphalt, naphthene, paraffine base crude or mixtures thereof.

Other lead compounds which have been used successfully are the phenyl compounds and other alkyl compounds besides tetra ethyl lead. These include the ethyl, isopropyl and method compounds. Methods of manufacturing lead compounds are described on page 134 et. seq., Vol. 111 of Watts' Dictionary of Chemistry as revised by Morley and Muir and published by Longmans, Green and Co., London, England.

Other metallic compounds may be used to suppress a knock in a motor. These include compounds of selenium, tellurium, tin, arsenic and antimony. The phenyl and alkyl compounds of these metals have been successfully used where the stable compounds are obtainable. The alkyl metal compounds usually have a greater knock suppressing value than the corresponding phenyl compounds.

Dissolving a knock suppressing substance in a hydrocarbon fuel has been found the most satisfactory method of changing the critical compression pressure of the fuel, and for this reason the organic compounds have been employed to a greater extent than other compounds in suppressing knocks, however, I do not limit my invention to organic compounds nor to the oil soluble compounds.

The value of metallic compounds in changing the critical compression pressure depends upon the metal used, the composition of the compounds, its stability and volatility. Up to the point of complete vaporization the anti-knock value depends in part on the percentage of the compound vaporized under engine conditions. Where the nature of the compound changes before ignition of the fuel, combustion of the fuel takes place in the presence of the new compound and the anti-knock value depends on the nature of the new compound instead of the compound added to the fuel.

If a radical is attached to the metal in the compound in such a manner that the resulting compound is oil soluble and volatile, a high anti-knock value for that metal is obtained. As the compound departs from these conditions either in the kind of radical employed or the number of radicals of a certain kind in the compound, the anti-knock value will generally be reduced. Examples of compounds in which the anti-knock value, as based on these conditions, becomes negligible are lead oleate and lead acetate. If, in the formula for tetra-ethyl lead, an OH radical is substituted for an ethyl radical, the resulting compound (tri-ethyl lead hydroxide) is less volatile and less soluble in the fuel than the tetra ethyl lead. The tri-ethyl lead hydroxide is almost as powerful a knock suppresser as the tetra ethyl lead.

The value of a compounded metallic element as a knock suppresser appears also to be a period function of the atomic number and, in general, with similar elements increases with increasing atomic weight. To illustrate this function, I take the ethyl compounds of the metals in the right hand column of the 4th, 5th, and 6th groups, wherever stable ethyl compounds are obtainable. As the ethyl compound of antimony is unstable in the air at room temperature, I employ the phenyl compound of antimony. These compounds increase in knock suppressing value in group 4 in the order tin, lead; in group 5 in the order arsenic, antimony; and in group 6 in the order selenium, tellurium. Taking group 4 as an example, 1% by volume of the ethyl compounds of the metals in gasoline or kerosene give the following increases in critical compression pressure: tin, 15 pounds; lead at the rate of 340 pounds when employed in relatively small quantities.

While I have mentioned more particularly the use of phenyl and alkyl compounds of certain metals for increasing the critical compression pressure of kerosene and gasoline, my invention is not limited wholly to the use of these compounds, nor to compounds of these metals, and the compounded metallic elements may be employed with the heavier hydrocarbon or other fuels.

Further, while the specific examples herein given constitute preferred forms of embodiment of the invention, it is to be understood that other forms might be adopted, without departing from the scope of the claims which follow.

I claim:

1. A method of utilizing a low compression motor fuel which comprises forming a combustible mixture of the fuel and air, and burning the mixture under a relatively high compression in the presence of vapors of a compounded metallic element.

2. A method as defined in claim 1, in which the gaseous low compression fuel is burned in the presence of a vaporized alkyl compound of a metal.

3. A method as defined in claim 1, in which the gaseous low compression fuel is burned in the presence of a gaseous ethyl compound of a metal.

In testimony whereof I hereto affix my signature.

THOMAS MIDGLEY, Jr.